US011669782B2

(12) United States Patent
Hampel et al.

(10) Patent No.: US 11,669,782 B2
(45) Date of Patent: Jun. 6, 2023

(54) METHOD AND A SYSTEM FOR ALLOCATING TICKET INVENTORY ON BUYER SIDE

(71) Applicant: StubHub, Inc., San Francisco, CA (US)

(72) Inventors: Brian Hampel, Bloomfield, NJ (US); Muktak Joshi, Aurangabad (IN)

(73) Assignee: StubHub, Inc., San Francisco, CA (US)

( * ) Notice: Subject to any disclaimer, the term of this patent is extended or adjusted under 35 U.S.C. 154(b) by 387 days.

(21) Appl. No.: 16/752,085

(22) Filed: Jan. 24, 2020

(65) Prior Publication Data
US 2020/0175433 A1 Jun. 4, 2020

Related U.S. Application Data

(63) Continuation of application No. 13/913,381, filed on Jun. 7, 2013, now Pat. No. 10,552,767.

(30) Foreign Application Priority Data

Jun. 15, 2012 (IN) .......................... 1739/MUM/2012

(51) Int. Cl.
G06Q 10/00 (2023.01)
G06Q 10/02 (2012.01)
G07B 5/00 (2006.01)
G07B 15/00 (2011.01)

(52) U.S. Cl.
CPC .............. G06Q 10/02 (2013.01); G07B 5/00 (2013.01); G07B 15/00 (2013.01)

(58) Field of Classification Search
None
See application file for complete search history.

(56) References Cited

U.S. PATENT DOCUMENTS

| 10,552,767 | B2 | 2/2020 | Hampel et al. | |
| 2006/0200308 | A1 | 9/2006 | Arutunian | |
| 2008/0103934 | A1* | 5/2008 | Gibson | G06Q 30/0641 705/5 |
| 2009/0063206 | A1 | 3/2009 | Payne et al. | |
| 2010/0223551 | A1* | 9/2010 | Twig | G06Q 30/0259 707/792 |

(Continued)

OTHER PUBLICATIONS

Non-Final Office Action received for U.S. Appl. No. 13/913,381, dated Apr. 8, 2016, 10 pgs.

(Continued)

Primary Examiner — Tonya Joseph
(74) Attorney, Agent, or Firm — McDermott Will & Emery LLP

(57) ABSTRACT

The present invention provides a method for allocating ticket inventory on a buyer's side. The method includes steps of, loading, the webpage, providing a map, checking compatibility of map, initializing plug-in, and mapping seats. Further, the map is represented with respective tickets with location, quantity and amount on the webpage. Moreover, the ticket list with triggering onInit is generated on the webpage or an existing external tabular ticket list is controlled by the plugin thereby loading the map completely with corresponding ticket inventory matching respective portions on map simultaneously while loading the webpage on the buyer's device thereby enabling the buyer to select desired seating section.

20 Claims, 8 Drawing Sheets

(56) References Cited

U.S. PATENT DOCUMENTS

| | | | |
|---|---|---|---|
| 2011/0202889 A1 | 8/2011 | Ludwig et al. | |
| 2011/0320227 A1 | 12/2011 | Thomas et al. | |
| 2012/0166960 A1* | 6/2012 | Salles | G06Q 10/02 715/738 |
| 2012/0173606 A1* | 7/2012 | Becker | G01C 21/3878 709/203 |
| 2013/0268899 A1 | 10/2013 | Valentino | |

OTHER PUBLICATIONS

Response to Non-Final Office Action filed Jul. 8, 2016, for U.S. Appl. No. 13/913,381, 9 pgs.
Final Office Action received for U.S. Appl. No. 13/913,381, dated Nov. 3, 2016, 12 pgs.
Response to Final Office Action filed Jan. 3, 2017, for U.S. Patent Application No. 13/913,381, 13 pgs.
Advisory Action received for U.S. Appl. No. 13/913,381, dated Feb. 6, 2017, 2 pgs.
Non-Final Office Action received for U.S. Appl. No. 13/913,381, dated Oct. 6, 2017, 11 pgs.
Interview Summary received for U.S. Appl. No. 13/913,381, dated Jan. 29, 2018, 3 pgs.
Response to Non-Final Office Action filed Feb. 6, 2018, for U.S. Appl. No. 13/913,381, 17 pgs.
Final Office Action received for U.S. Appl. No. 13/913,381, dated May 29, 2018, 10 pgs.
Response to Final Office Action filed Jul. 30, 2018, for U.S. Appl. No. 13/913,381, 9 pgs.
Advisory Action received for U.S. Appl. No. 13/913,381, dated Sep. 7, 2018, 2 pgs.
Non-Final Office Action received for U.S. Appl. No. 13/913,381, dated Nov. 19, 2018, 11 pgs.
Response to Non-Final Office Action filed Feb. 13, 2019, for U.S. Appl. No. 13/913,381, 8 pgs.
Final Office Action received for U.S. Appl. No. 13/913,381, dated May 24, 2019, 5 pgs.
Response to Final Office Action filed Jul. 22, 2019, for U.S. Appl. No. 13/913,381, 9 pgs.
Advisory Action received for U.S. Appl. No. 13/913,381, dated Aug. 29, 2019, 2 pgs.
Notice of Allowance received for U.S. Appl. No. 13/913,381, dated Oct. 2, 2019, 7 pgs.
First Examination Report received for Indian Patent Application No. 1739/MUM/2012, dated Jul. 22, 2019, 6 pgs.
Response to First Examination Report received for Indian Patent Application No. 1739/MUM/2012, filed Jan. 3, 2020, 16 pgs.

* cited by examiner

| Section | Row | Quantity | Price |
|---|---|---|---|
| Premier 7 | 6 | 2 | $135.00 |
| 5 | 6 | 4 ▽ | $152.00 |
| STE A6 | | 2 | $852.00 |
| Courtside GA | | 2 | $1152.00 |
| Park C | | 1 | $30.00 |

METHOD AND A SYSTEM FOR ALLOCATING TICKET INVENTORY ON BUYER SIDE

CROSS-REFERENCE TO RELATED APPLICATIONS

This application is a continuation of U.S. patent application Ser. No. 13/913,381, filed on Jun. 7, 2013; which claims priority to Indian Application No. 1739/MUM/2012, filed on Jun. 15, 2012; the disclosures of which are incorporated herein by reference in their entireties.

FIELD OF THE INVENTION

The present invention relates to a method and system for allocation of tickets, more particularly, the present invention relates to a method and a system for allocation of tickets on buyer side without altering the client's system/server.

BACKGROUND OF THE INVENTION

Nowadays, traditional method of buying tickets on the counter has reduced due to availability of an option of buying tickets using computer system with internet. Buyer can buy tickets and the seller can sell tickets online using internet and electronic commerce. Buying tickets or any goods using internet has reduced cost as the buyer can remotely purchase tickets or goods. Internet also provides an effective advertisement platform for the sellers. Therefore, sellers actively use the internet to offer, sell and distribute tickets to take advantage of the many benefits provided by the Internet and electronic commerce.

Further, US patent publication No's: 20080103934 and 20110320227 of StubHub describes a system and method of illustrating and locating at least one ticket in an event venue. The system is a network-based system which implements an online ticket marketplace for buyers and sellers of tickets for live events such as sports, concerts, theater, and other entertainment events. The StubHub online ticket marketplace enables convenient, reliable, and secure transactions at fair market value and provides ticket fulfillment services, even for "sold out" events. But StubHub uses predefined mapping between the tickets and sections on the interactive map done on server side. These mapping are stored on the server and thus the tickets and maps are tightly bound together. To use this system to power a different collection of ticket inventory will require modifications to the server information to allocate tickets.

Therefore there is no platform which provides accurate association of the Ticket on the Interactive Venue Map using a Client Side Algorithm, or similar web browser language in which the execution happens on the buyer's computer or device, when no prior association exists in Tickets and Venue Map Sections.

SUMMARY OF THE INVENTION

In view of the forgoing disadvantages inherent in the prior-art, the general purpose of the present invention is to provide a method and a system for allocating ticket inventory on buyer side that is configured to include all advantages of the prior art, and to overcome the drawbacks inherent in the prior art.

An object of the present invention is to provide a method and a system for allocating ticket inventory on buyer side, which enables real-time association of the Ticket on the Interactive Venue Map using a Client Side Algorithm, or similar web browser language in which the execution happens on an buyer's computer or device, when no prior association exists in Tickets and Venue Map Sections.

Another object of the present invention is to provide a method and a system for allocating ticket inventory on buyer side, which are capable of displaying three dimensional (3D) view of the stadium, as viewed from the section of ticket.

Yet another object of the present invention is to provide a method and a system for allocating ticket inventory on buyer side, which can operate on a browser operable on cell phones.

Further object of the present invention is to provide a method and a system for allocating ticket inventory on buyer side, which provides multiple color maps.

Further one object of the present invention is to provide a method and a system for allocating ticket inventory on buyer side, which is capable of locating sites out of map, such as parking lot and the like.

To achieve the above objects, in an aspect of the present invention, a method for allocating ticket inventory on a buyer's side. The method includes steps of, loading, the webpage, providing a map, checking compatibility of map, initializing plug-in, and mapping seats. The webpage with a ticket inventory provided from a first server is loaded on buyer's side in a web browser or similar application. The map is provided from a second server on the webpage, the map is pre-defined according to an event and a site. The compatibility of the corresponding map is checked. The plug-in initialized from the second server for mapping the ticket inventory against sections of the map, if the map is interactive the seats are mapped. The seats from the ticket inventory are mapped with respective sections on the map using abbreviations and alias enabled search and by performing several iteration till ever ticket is mapped against a section. Further, the map is represented with respective tickets with location, quantity and amount on the webpage. At the end the ticket list with triggering onInit is generated on the webpage or an existing external tabular ticket list is controlled by the plugin thereby loading the map completely with corresponding ticket inventory matching respective portions on map simultaneously while loading the webpage on the buyer's device thereby enabling the buyer to select desired seating section.

In another aspect of the present, a system for allocating ticket inventory on a buyer's side. The system includes a in a web browser or similar application, a first server and a second server. The user interface is loaded in a web browser or similar application, wherein the user interface is operated by a buyer for purchasing at least one ticket. The first server having ticket inventory. Further, the user interface along with the inventory is downloaded from the first server using internet in a web browser or similar application. The second server having a plurality of maps preinstalled for pre-defined events and locations. Also, a plug-in is provided on the webpage for mapping of the ticket inventory against respective section of a pre-defined map, thereby enabling the buyer to select and purchase desired seating section by selecting a respective ticket.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The term "top", "bottom" and the like, herein do not denote any order, elevation or importance, but rather are used to distinguish placement of one element over another, and the terms "a" and "an" herein do not denote a limitation of quantity, but rather denote the presence of at least one of the referenced item.

The present invention provides a method and a system for allocating ticket inventory on buyer side. The method and the system enables association of the Ticket on the Interactive Venue Map using a Client Side Algorithm, or similar web browser language in which the execution happens on the buyer's device/browser having internet, when no prior association exists in Tickets and Venue Map Sections. Further, the method and the system which are capable of displaying three dimensional (3D) view of the stadium, as viewed from the section of ticket. The method and the system enables a buyer to view seating arrangement and there fees on browser operable on cell phone. Also, the method and the system provide colored maps which are capable of locating sites out map, such as parking lot and the like.

Figure 1:
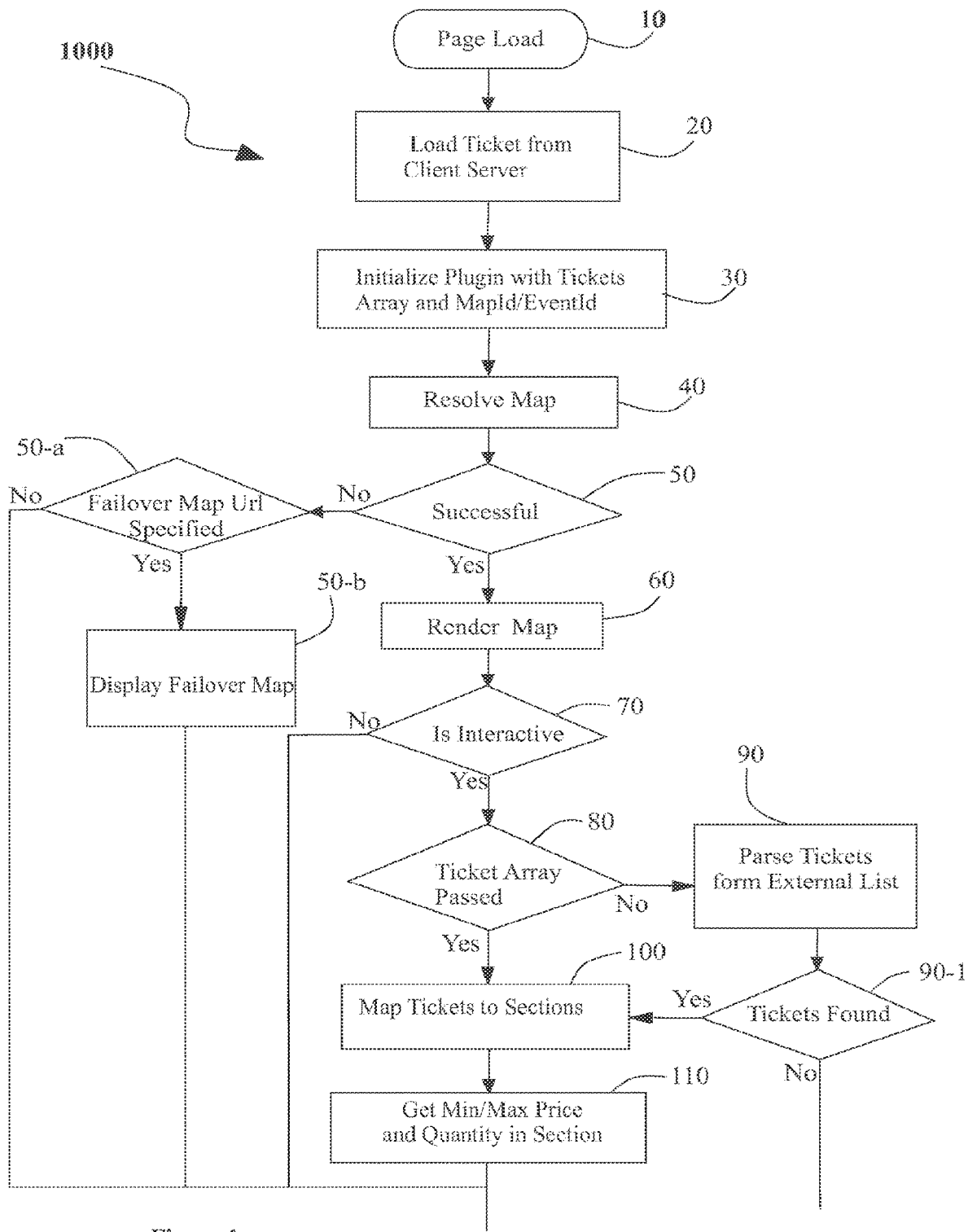
FIG. 1 shows a flow chart of a method for allocating ticket inventory on buyer side, in accordance with the present invention.
Figure 1:
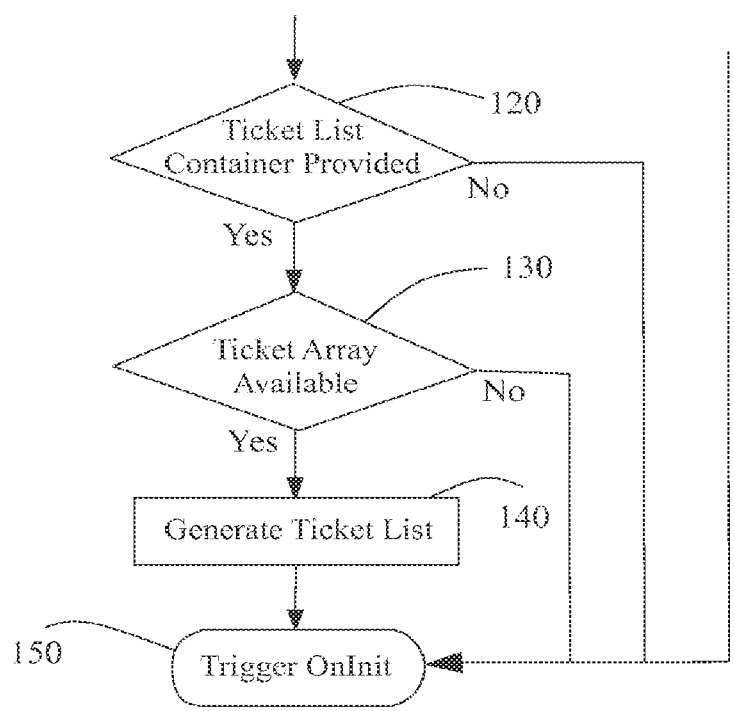

Referring now to FIG. 1, a flow chart of a method 1000 for allocating ticket inventory on buyer side in accordance with the present invention is illustrated. The method 1000 starts at step 10, a buyer visits ticket listing webpage for loading the webpage therefore. The webpage is loaded from the first server. The first server is the client's server. The buyer uses a user interface with internet browser for loading the page on an electronic device. The user interface will be loaded on a web browser or similar application running thereon any electronic device enabling use of a web browsing through internet. The webpage loads on the user interface and ticket inventory, such as section, row, quantity, cost, Notes and the like is Loaded on the webpage in the form of array (a collection of data items that can be selected by indices computed at run-time) from client's web Server at step 20. The client is a company having list of tickets and is in need to sell them. In an embodiment, the web browser can be accessed by using user interfaces on electronic devices, such as computer, tablet computer, mobile or other similar devices. Further, a client side script/plug-in (or anything similar) executing on the webpage, which initializes the provider plug-in on loading of the page at step 30. In an embodiment, plug-in is a program that will generate the map and process the inventory to associate it with the sections on the Venue Map. The plug-in will then requests the map from second server using TicketUtils MapId or TicketUtils EventId or MapId/EventId of any Point of Sale System/Inventory Management System at step. The second server is service provider's server.

At step 40, service provider's server will check if the Client is allowed to use the interactive map service. If allowed it will return section groups with name and alias, sections with their names, alias, coordinates on the map. If interactive map is not available and auto switch to static is enabled it will return Data for Static Map, in other case it will return error. If the map data is successfully returned, it will proceed to step 50 else, script will check for the reason of failure. If the Reason of failure is Unauthorized Access the Script will stop executing. If the reason is simply unavailability of the Map or Connectivity problem it will proceed to step 50-*a*. At step 50-*a*, the client has ability to display a custom map or external map/Image if TicketUtils map loading fails. This is indicated by FailOverMapUrl. This is a URL of the Image the plug-in should try to load if map loading fails. If the URL is provided, it will proceed to step 50-*b*. At step 50-*b*, the plug-in will load the FailOverMapUrl and proceed to step 120.

At step 60, if map data loading is successful, the plug-in loads the map images according to color scheme selected by the client. The map can be made available in several pre-configured color schemes or even custom color schemes defined by the client. In an embodiment, the map supports three dimensions (3D) section views. At step 70, if the map returned by Provider's Server is Static Map (i.e. Buyer cannot interact with the map or click on the sections to purchase the tickets) the Plug-in will jump to Step 120. But if interactive map is returned, it will proceed through Step (80 to 110) to Map the Tickets on the Interactive Chart. At step 80, the plug-in will determine if the tickets are provided in the form of array or plug-in will have to extract/convert it from another format. If array is not provided, then plug-in will jump to Step 90.

As the Tickets Array is not provided in standard format, the plug-in tries to convert the Tickets from the external format using the information provided by the Client's Script at step 90. At step 90-1, if no tickets are found at the external source, then the plug-in will Jump to step 150).

Figure 2:
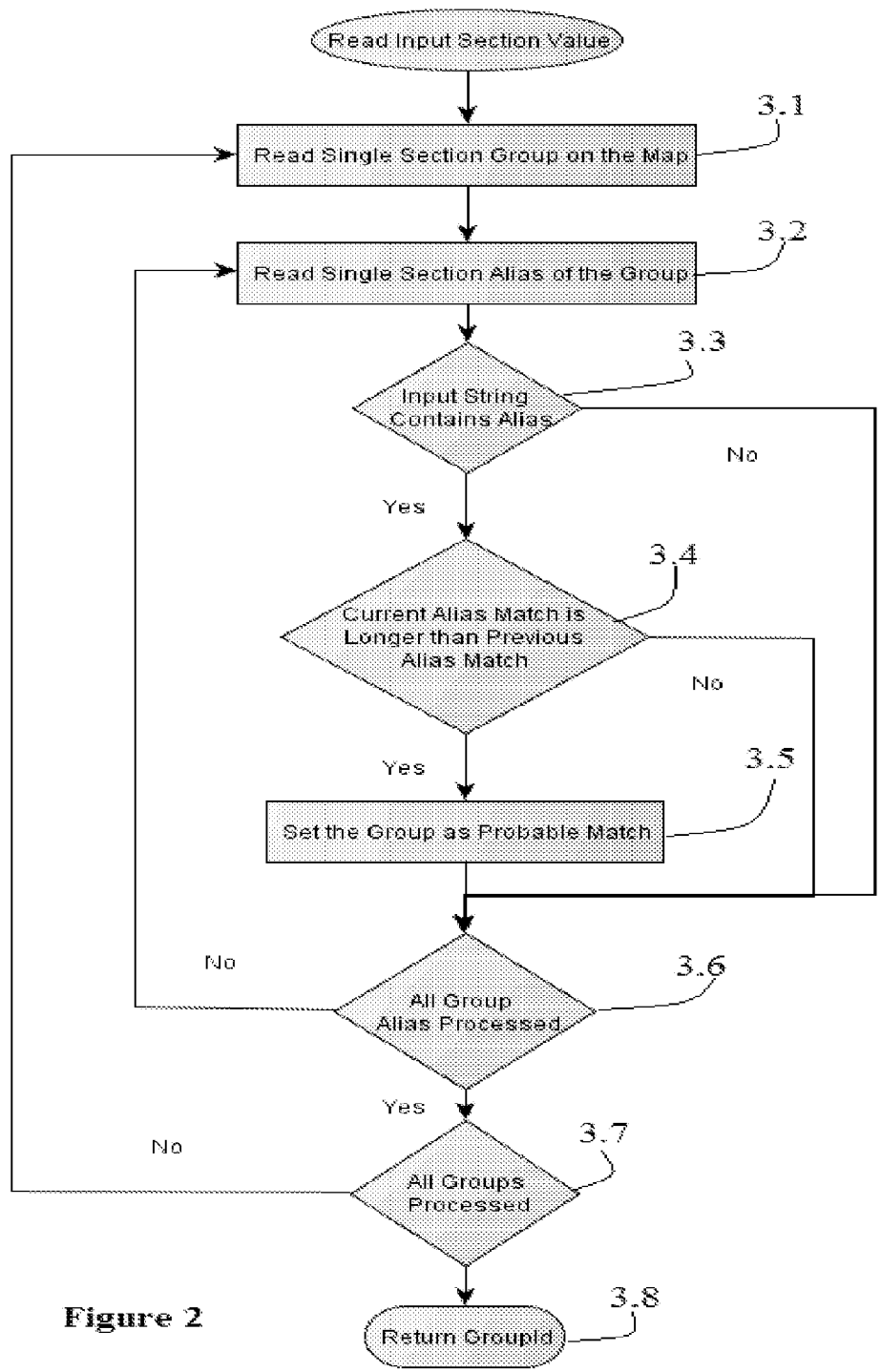
FIG. 2 shows a flow chart of the process for resolving section group by filtering the section, a step of the method of FIG. 1 *a* in accordance with the present invention.

At step 100, the process 1000 maps the tickets with respective sections (refer FIG. 2). Further, the plug-in will iterate through all tickets again and find maximum price, minimum price and total quantity of ticket available in a section at step 110. The plug-in can either interact with external tabular ticket list or can generate a tabular ticket list on the client's webpage depending on the configuration at step 120, and if external Ticket List is already present the plug-in will skip to step 150. At step 130, the plug-in will check if the tickets array is parsed and is available in previous step. If tickets are available, the plug-in will generate the tickets List at step 140. At step 150, the plug-in will trigger OnInit and intimate the script running on the client's webpage that the map loading process is completed and the process 1000 ends.

OnInit event is provided to signal the script on client's page that map loading is completed and other external operations can be performed by the client script. For example, setting the price slider, quantity filters etc.

Figure 1A:
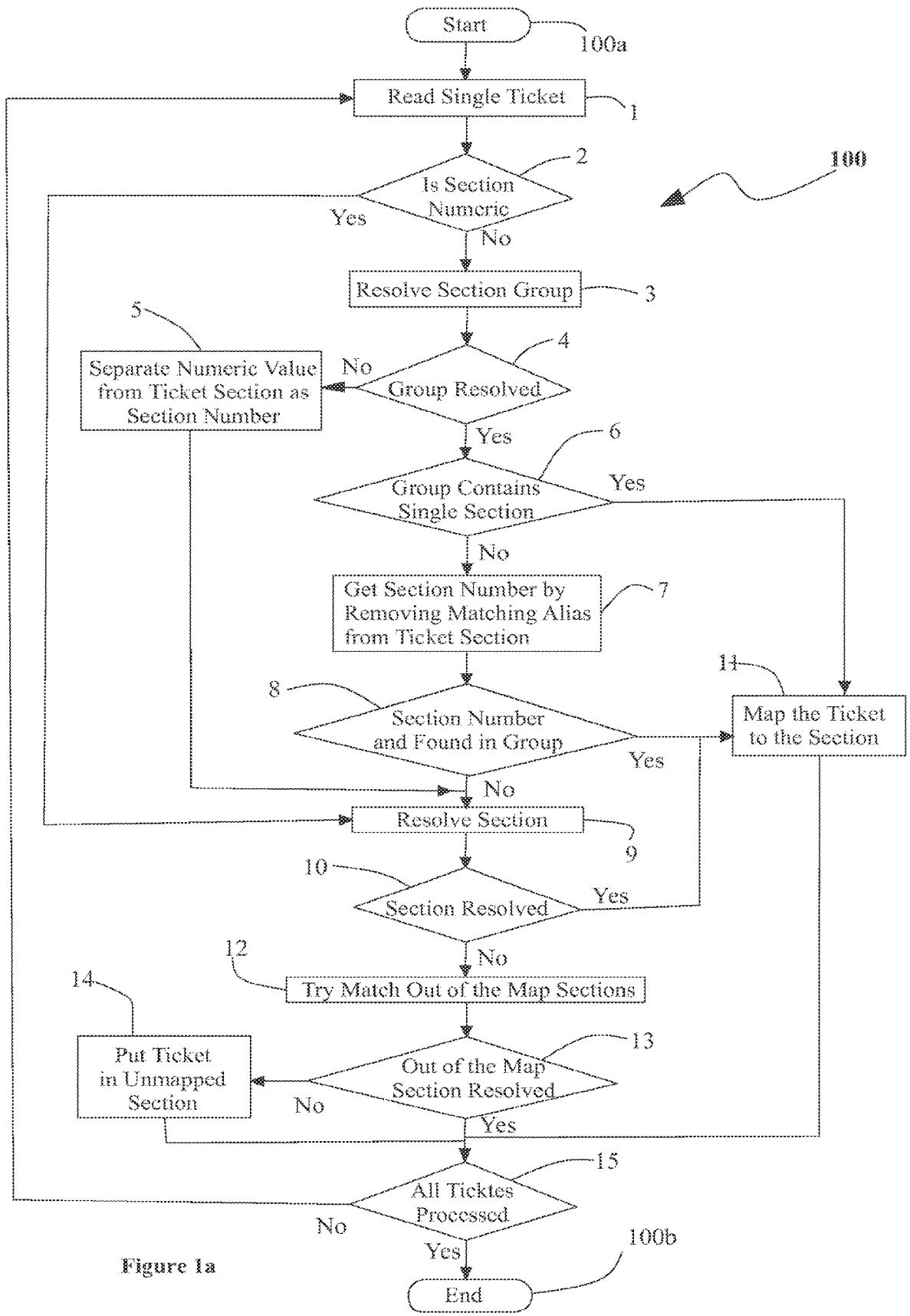
FIG. 1a shows a flow chart of a rendering map, a step of the method of FIG. 1 in accordance with the present invention.

Referring now to FIG. 1a, a flow chart of the method 100 for rendering map a step of method 1000 in accordance with the present invention is illustrated. The buyer is a person who wants to book ticket. Further, the method 100 starts at step 100a.

The input to the invention is provided as a list of Tickets available for that Venue. At step 1, reading a single ticket value from the input list and reading the section value of the single ticket selected.

Thereafter at step 2 it is decided whether the read value of the ticket is only numeric (section value) or alphanumeric (section group with section value) containing. If the value is alphanumeric, then at step 3 the section group is resolved by filtering the section value (for e.g. "9" is a section value). Thereafter, at step 4 if the group is resolved and if the group does not contains single section then at step 6 the ticket is directly mapped with the group. As the group is resolved, removing the matching alias from the input will yield the section number at step 7 (E.g. matching alias is "Premier" which when removed from input "Premier 9" will yield 9). In an embodiment, section group is a group of sections of similar level or category. For example: Suites, Premier Level and the like.

Further, at step 8 check if section number obtained at step 7 exists in the resolved group. If the section is not resolved at step 8, at step 9 the method 100 tries to match the section by iterating through the section. If the section is still not resolved at step (9 and 10), at step 12 the method 100 tries to match the section with NOP (not on the map) or OOM (Out of Map) section. If NOP is resolved at step (12 and 13) then at step 15 it is checked whether all the tickets are allotted or not, if yes then at step 100b the method 100 ends else, the method 100 from step 1 is again repeated till all the tickets are allocated.

Referring again to FIG. 1 a, at step 2 if the value of the ticket is only numeric (section value), then the method 100 is forwarded to step 9. Further, at step 4 if the group is not resolved, then at step 5 it is assumed that section number section number can be obtained by removing all non-numeric characters from the input (E.g. Strip off "Level" from Input "Level 9" to get "9" as Section Number). Thereafter, the method is directed to step 9 for to match it with iterating through the sections.

Further, at step 6 if the group contains single section and at step 9 if the section is mapped then forwarded to step 11. At step 11, the tickets are mapped to resolve section and jumped to step 15. At step 13, if the out of map section is not resolved, then the position of ticket is represented in unmapped section and then jumped to step 15.

Referring now FIG. 2, flow chart of the process for resolving section group by filtering the section of step 3 of the method 100 in accordance with the present invention is depicted. At step 3.1, the method 100 reads one section group on the map. Thereafter, at step 3.2 the method 100 iterates through all section group aliases and tries to match those with input section value. This step enables reading of one section alias for the group. In an embodiment, section group alias are Synonyms, Abbreviations by which a Section Group may be denoted. Example: Premier Level sections can be denoted by Premier, PR, PREM abbreviations. Section Alias is Synonyms, Abbreviations, and Alternate Names by which Section may be denoted. Example: Section 517 in Example Madison Square Garden can be denoted as West Balcony 17. OOM Section is an Out of the Map Section is a Section which is not represented/cannot be represented on the map. For Example: Parking, VIP Passes. Exact Matching of Section has Ability to Flag all Sections in a Particular Section Group to exclude from Mapping any Tickets till a Group Match is Resolved. Exact Matching for OOM Sections has Ability to Flag an Out of the Map section for Pattern Matching or Full String Matching.

Further, at step 3.3, if the input section name contains the alias then it might be a probable match and forwarded to step 3.4. At step 3.4, the if the current alias match is longer than previous match, then at step 3.5 the input is set as a probable match. Thereafter, at step 3.6 if the alias of the group are process then at step 3.7 it is checked whether all groups are processed. If all the groups are processed then at step 3.8 return longest matching alias and group-id as final match.

Further, at step 3.3 if the input sting does not contain alias then it is forwarded to step 3.6. At step 3.4 if the current alias is not longer than the previous match it is forwarded to step 3.6. At step 3.6 if the all the groups are not processed then again from step 3.2 are repeated. At step 3.7 if all the groups are not processed, then the method from step 3.1 is repeated.

Figure 3:
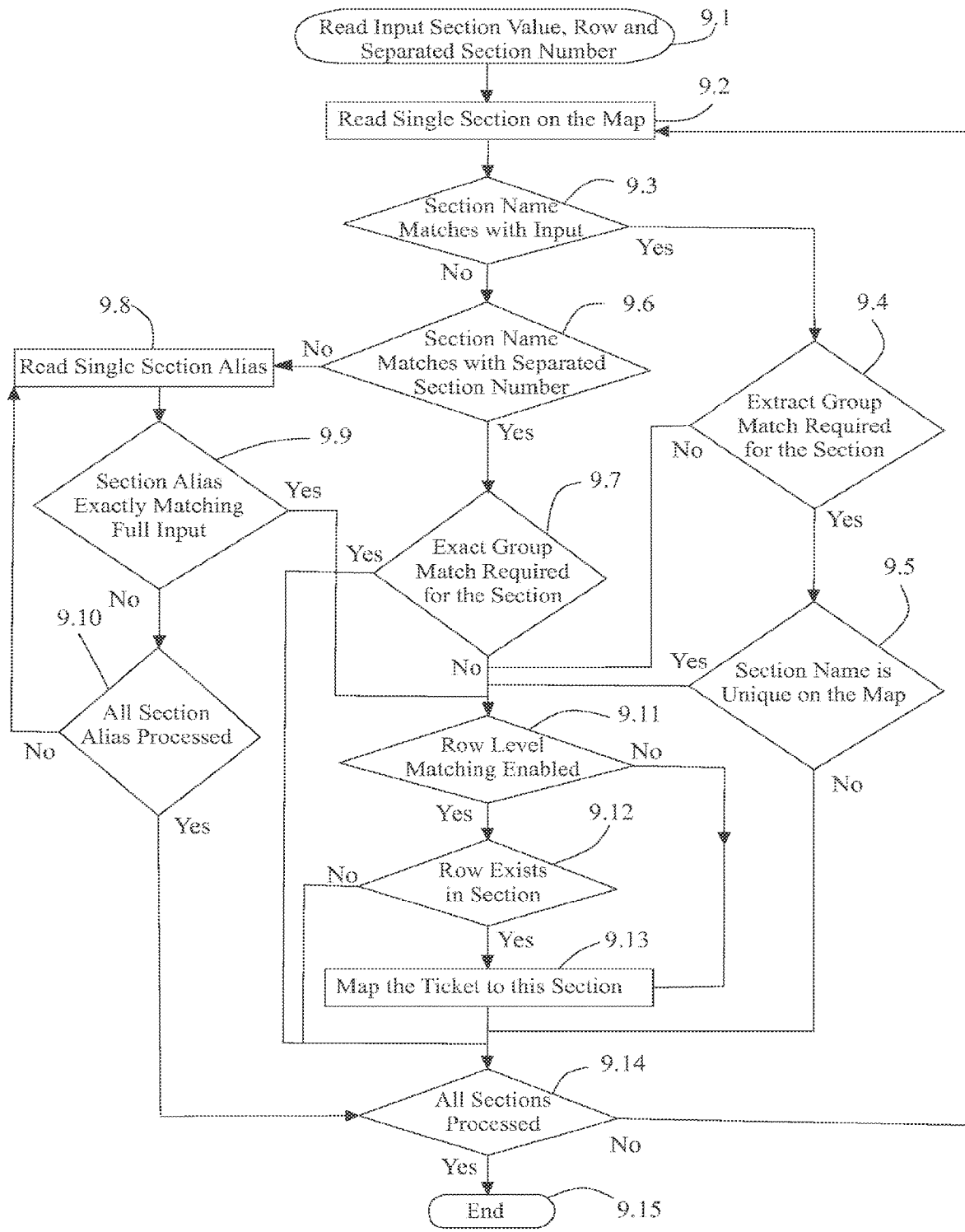
FIG. 3 shows a flow chart for the process of iterating through the section, a step of the method of FIG. 1a in accordance with the present invention.

Referring now to FIG. 3, a flow chart for the process of iterating through the section of step 9 of the method 100 of FIG. 1a in accordance with the present invention is illustrated. At step 9.1, the iteration process reads the section value, row and separated section number. Further, at step 9.2 iteration through all the sections of the map is performed by reading single sections from the map. If the section does not matches with the input at step 9.3, then check if section name matches with the separated section number obtained a input at step 9.6. If there is a match then check if the exact group match is also required at step 9.7, if the match is not required then it is considered that the match is found and check if row level matching is also enabled at step 9.11, if yes then at step 9.12 check if the row exists in the section. If yes, then map the ticket in the section at step 9.13. Further, check if all the sections are processed, if yes the process ends at step 9.15 else, again the entire process from the step 9.1 is repeated.

Further, if the section name exactly matches with the input at step 9.3, then check if performed if each group is also required at step 9.4. If yes, then check is performed for section name is unique on the map at step 9.5, if yes then go to step 9.11 else go to step 9.14. At step 9.6, if the section name does not matches with the separated section number obtained as input, then iterate through the entire sections alias by reading single section alias at step 9.8. Then check if section alias exactly matches with the full input section value, if yes then go to step 9.11 else, check if all the section alias are processed or not. If all the section alias are not processed then step (9.8 and 9.9) are repeated and if all the section alias are proceed then the method jumps to step 9.14 for check if all the section are processed or not.

Figure 4:
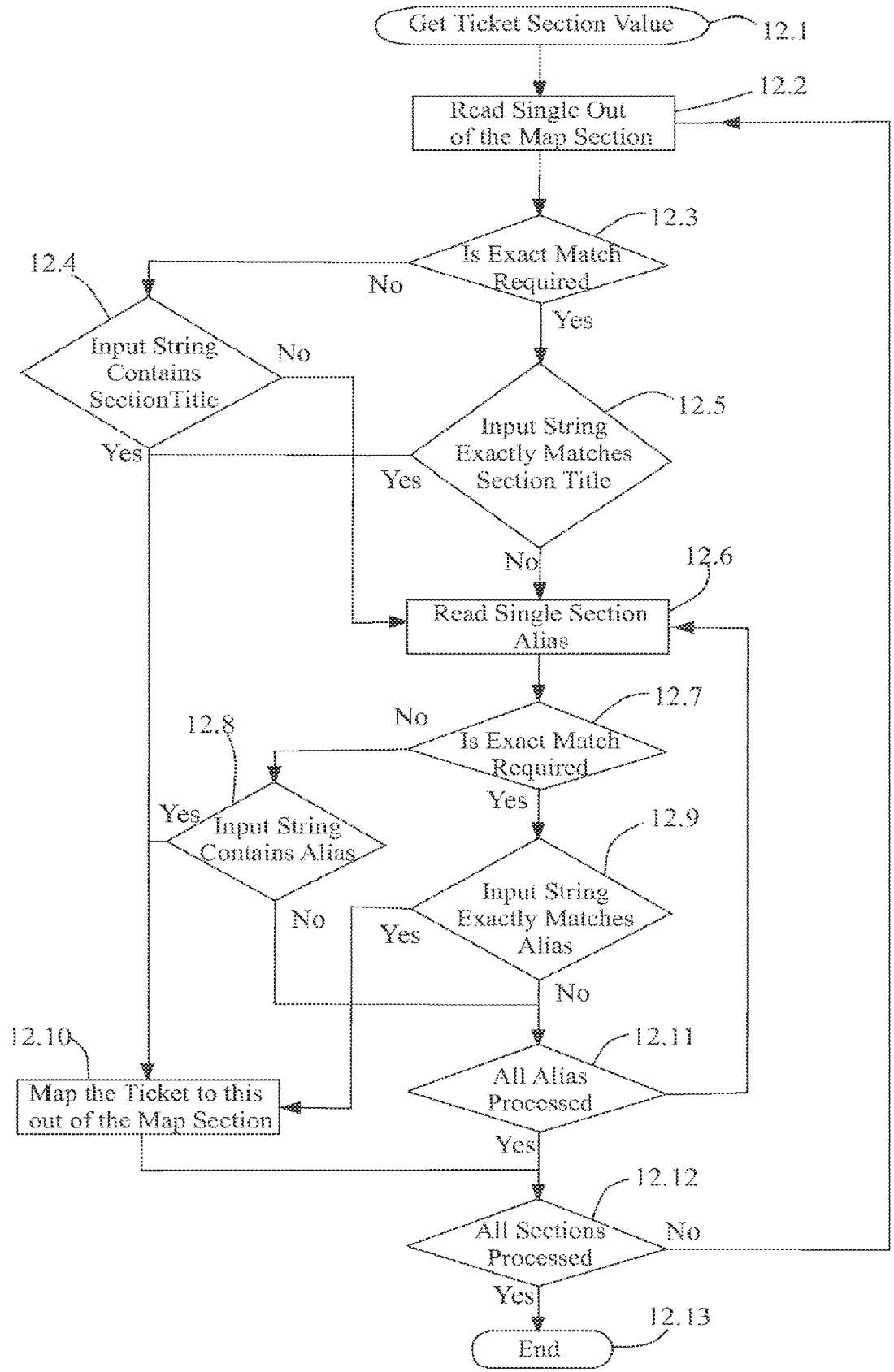
FIG. 4 shows a flow chart of process for matching section which is out on the map (OOM Sections), a step of the method of FIG. 1a in accordance with the present invention is illustrated.

Referring now to FIG. 4, a flow chart of process for matching section which is out on the map (OOM Sections) of step 12 of the method 100 in accordance with the present invention is illustrated. The process started by reading ticket section value at step 12.1. Further, a single OOM section is read at step 12.2. Thereafter, at step 12.3, check is performed to detect if exact matching is enabled. If yes, then at 12.5 it is checked if the input string matches exactly with the OOM section title. If no, then iteration through OOM section alias is read for matching at step 12.6. Thereafter, check is performed to detect if exact matching is enabled at step 12.7. If input string does not matches with the OOM Section alias at step 12.9 then at step 12.11 it is checked whether all the alias are checked or not. If not then the process from the steps 12.2 are repeated, if yes then the process is ended at step 12.13.

Referring again to FIG. 4, at step 12.3 if the opposition of exact match is not enabled then at step 12.4, it is checked whether the input string contains sections title, if 'no', then forwarded to at step 12.6, else at step 12.10 the ticket is mapped on OOM section and the process connects with the step 12.11. Further, at step 12.7 if exact alias is not required then at step 12.8 it is checked whether input contains exact alias or not.

Figures 5, 6:
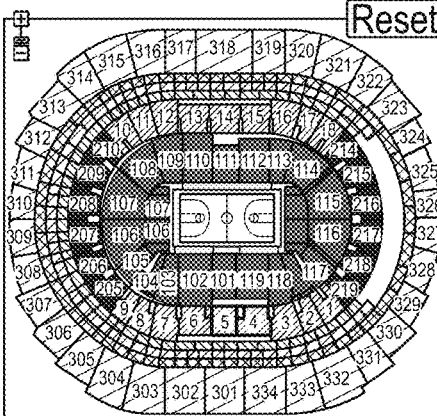
FIG. 5 shows a window provided on a buyer's device/browser for booking tickets.
FIG. 6 shows seating arrangement and Out of Map (OOM) section of a stadium Staples Center a Basketball stadium.
Figure 7:
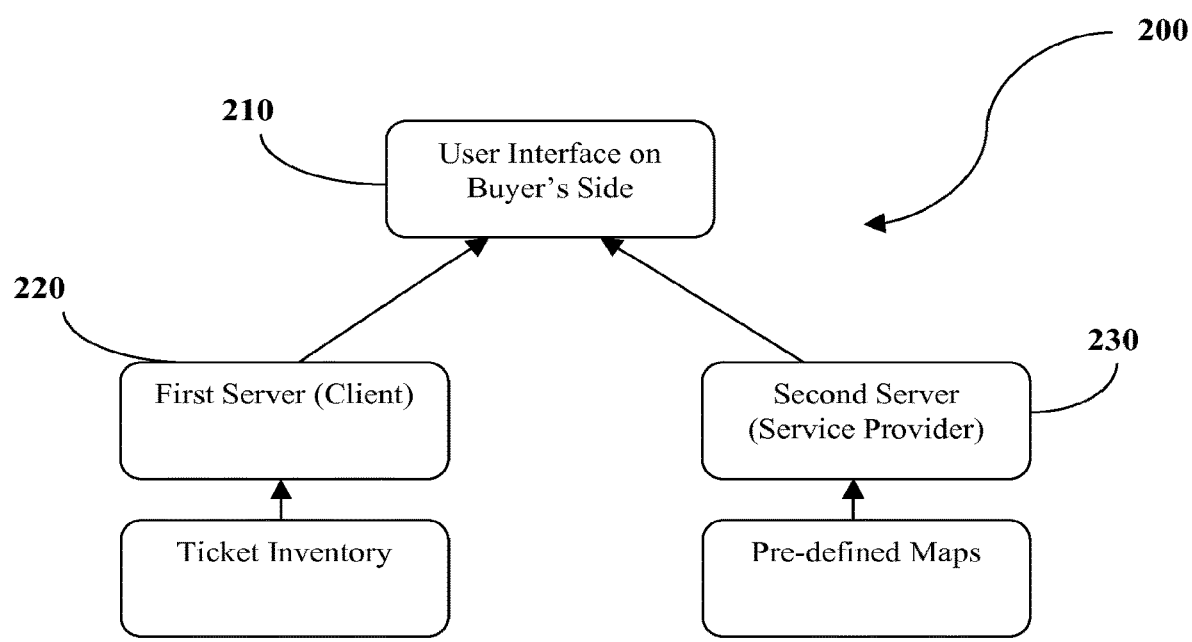
FIG. 7 shows a block diagram of the system for allocating ticket inventory on buyer side, in accordance with the present invention.

Referring now to FIG. 7, a block diagram of a system 200 for allocating ticket inventory on a buyer's side in accordance with the present invention is illustrated. The system 200 is described in with reference to the method 1000 as described above for the sake of brevity. The system 200 of the present invention includes a user interface 210, a first server 220 and a second server 230 as shown in FIG. 7. The user interface 210 can be loaded with a web browser or similar application running thereon any electronic device having a facility for browsing using browser and internet to book a ticket to buyer. The first server 220 is a client's server. The second server 230 is a service provider's server. The client is person or a company in need to sell tickets for a show and the service provider is the applicant of this patent application or a person or a company using abovementioned method. The first server 220 contains plain inventory with client specific nomenclature for various sections. The second server 230 includes predefined maps generated with reference to the venue of the event and various combinations of the nomenclature for each section in the venue. The above mentioned method 1000 is used by the second server 230 along with the ticket inventory on the first server 220 to load a map with location of a ticket and there price on the user interface without disturbing or altering the inventory located on the first server 220. FIG. 5 shows a stadium Staples Center—a Basketball stadium is shown for explanation only.

Section Groups Configuration

| Section Group | Alias | Exact Matching Enabled |
|---|---|---|
| Courtside | Courtside | No |
| Premier Level | PR, PREM, Premier | No |
| Suites A | Suite A, STE A | Yes |
| Suites B | Suite B, STE B | Yes |
| Suites C | Suite C, STE C | Yes |
| Lower Level & Risers | — | No |
| Mid Level | — | No |
| Upper Level Concourse | — | No |

OOM Sections

| Section Group | Alias | Exact Matching Enabled |
|---|---|---|
| Parking | Park | No |

The method 1000 and the system 200 of the present invention provides following advantages of generating three dimensional (3D) view of the stadium, as viewed from the section of ticket. Further, the method 1000 and the system 200 can operate on cell phones. The method 1000 and the system provide multiple color maps. Also, the method 1000 and the system 200 are capable of locating sites out of map, such as parking lot and the like.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A method comprising:
   receiving, from a first server associated with a first entity, at a web browser on a device, a webpage with a ticket inventory from the first server;
   receiving, from a second server associated with a second entity, a map, pre-defined according to an event and a venue, wherein the first entity and the second entity are different entities and the map is one of an interactive map or a static map;
   verifying whether the interactive map is available and switching to the static map when the interactive map is not available, wherein an availability of the interactive map is based on one of an unauthorized access and a connectivity issue;
   when the interactive map is available, mapping, on the device with the web browser, seats from the ticket inventory with respective sections on the map until each ticket of the ticket inventory received from the first server is mapped against a section;
   when the interactive map is not available, generating a tabular ticket list of available tickets on the webpage displayed on the device;
   rendering, on the webpage displayed on the device, a combination of the map and an indication of a quantity of tickets in the ticket inventory, an amount for each ticket of the ticket inventory, and a location on the map for each ticket of the ticket inventory, without altering the ticket inventory from the first server;
   providing, on the device with the web browser a three-dimensional view of the venue as viewed from the section of the ticket; and
   facilitating selection of a ticket by providing the map.

2. The method of claim 1, wherein the seats from the ticket inventory are mapped with respective sections on the map using an abbreviations and alias enabled search and the abbreviations and alias are used for searching relevant sections corresponding to the ticket inventory on the map.

3. The method of claim 1, wherein the selection of a ticket is performed on the webpage displayed on the device.

4. The method of claim 1, further comprising mapping of out of map sections in the ticket inventory if the map has an out of map section.

5. The method of claim 1, wherein the second server interacts with an external tabular ticket list of the ticket inventory provided on the webpage.

6. The method of claim 1, wherein the second server generates a tabular ticket list of the ticket inventory on the webpage.

7. The method of claim 1, wherein the map comprises a different color for each section.

8. The method of claim 1, wherein the map comprises three dimensional section views.

9. A system comprising;
a first server associated with a first entity having ticket inventory, the first server comprising:
a first non-transitory memory, storing first instructions; and
at least one first processor coupled to the first non-transitory memory and operable to execute the first instructions from the first non-transitory memory, causing the first server to perform first operations, the first operations comprising: providing a webpage to a user interface operated on an electronic device,
wherein the user interface is configured to download the ticket inventory from the first server; and
a second server associated with a second entity, wherein the first entity and the second entity include different entities, the second server comprising:
a second non-transitory memory, storing second instructions and multiple maps for pre-defined event and a venue, wherein the maps include at least one of an interactive map or a static map; and
at least one second processor coupled to the second non-transitory memory and operable to execute the second instructions from the second non-transitory memory, causing the second server to perform second operations, the second operations comprising:
verifying whether the interactive map is available and switching to the static map when the interactive map is not available, wherein an availability of the interactive map is based on an unauthorized access and a connectivity issue;
when the interactive map is available, mapping on the electronic device, seats from the ticket inventory with respective sections on the map until each ticket of the ticket inventory received from the first server is mapped against a section;
when the interactive map is not available, generating a tabular ticket list of available tickets on the webpage displayed on the electronic device;
providing a three-dimensional view of the venue as viewed from a section of a ticket; and
providing a map and code on the webpage provided by the first server for mapping, on the electronic device, the ticket inventory against respective sections of the map, wherein providing the map on the webpage on the electronic device does not alter the ticket inventory, wherein providing the webpage and the map on the electronic device enables selection of tickets by selecting a respective position on the map.

10. The system of claim 9, wherein the first server is a client's server.

11. The system of claim 9, wherein the second server is a service provider's server.

12. The system of claim 9, wherein the user interface is loaded on the electronic device in a web browser enabling web browsing through a network.

13. One or more non-transitory computer-readable media comprising one or more computer-readable instructions that, when executed by one or more processors of a computing system, cause or direct the computing system to perform operations comprising:
receiving, from a second server associated with a second entity, a map, pre-defined according to an event and a site, wherein a first entity and the second entity are different entities and the map is one of an interactive map or a static map;
verifying whether the interactive map is available and switching to the static map when the interactive map is not available, wherein an availability of the interactive map is based on an unauthorized access and a connectivity issue;
when the interactive map is available, mapping, on a device communicatively coupled with a web browser, seats from a ticket inventory with respective sections on the map until each ticket of the ticket inventory received from a first server associated with the first entity is mapped against a section;
when the interactive map is not available, generating a tabular ticket list on a webpage for the site, displayed on the device;
rendering, on a webpage displayed on the device, a combination of the map and an indication of a quantity of tickets in the ticket inventory, an amount for each ticket of the ticket inventory, and a venue for each ticket of the ticket inventory, without altering the ticket inventory from the first server;
providing, on the device with the web browser a three-dimensional view of the venue as viewed from the section of the ticket; and
facilitating selection of a ticket by providing the map.

14. The one or more non-transitory computer-readable media of claim 13, wherein the seats from the ticket inventory are mapped with respective sections on the map using an abbreviations and alias enabled search and the abbreviations and alias are used for searching relevant sections corresponding to the ticket inventory on the map.

15. The one or more non-transitory computer-readable media of claim 13, wherein the selection of a ticket is performed on the webpage displayed on the device.

16. The one or more non-transitory computer-readable media of claim 13, wherein the operations further comprises mapping of out of map sections in the ticket inventory if the map has an out of map section.

17. The one or more non-transitory computer-readable media of claim 13, wherein the second server interacts with an external tabular ticket list of the ticket inventory provided on the webpage.

18. The one or more non-transitory computer-readable media of claim 13, wherein the second server generates a tabular ticket list of the ticket inventory on the webpage.

19. The one or more non-transitory computer-readable media of claim 13, wherein the map comprises a different color for each section.

20. The one or more non-transitory computer-readable media of claim 13, wherein the map comprises three dimensional section views.

* * * * *